United States Patent
Rahman

(10) Patent No.: US 7,365,468 B2
(45) Date of Patent: Apr. 29, 2008

(54) MOTOR STATOR HAVING TRANSPOSED WINDING LAYERS

(75) Inventor: Ziaur Rahman, Herndon, VA (US)

(73) Assignee: BluWay Systems, LLC, Rochester Hills, MI (US)

( * ) Notice: Subject to any disclaimer, the term of this patent is extended or adjusted under 35 U.S.C. 154(b) by 0 days.

(21) Appl. No.: 10/893,876

(22) Filed: Jul. 20, 2004

(65) Prior Publication Data

US 2006/0017347 A1   Jan. 26, 2006

(51) Int. Cl.
*H02K 3/18* (2006.01)
*H02K 3/28* (2006.01)

(52) U.S. Cl. .............. 310/184; 310/180; 310/185; 310/198; 310/208; 29/605

(58) Field of Classification Search .......... 310/180, 310/184–185, 194, 198, 202–203, 188, 208; 336/187–188; 242/432–433; 29/605
See application file for complete search history.

(56) References Cited

U.S. PATENT DOCUMENTS

| | | | | |
|---|---|---|---|---|
| 3,747,205 A | * | 7/1973 | Moore | 29/605 |
| 3,851,231 A | * | 11/1974 | Eastham et al. | 318/135 |
| 4,967,464 A | | 11/1990 | Stephens | |
| 6,162,122 A | * | 12/2000 | Acres et al. | 318/439 |
| 6,492,756 B1 | * | 12/2002 | Maslov et al. | 310/156.12 |
| 6,617,746 B1 | * | 9/2003 | Maslov et al. | 310/254 |
| 2002/0096959 A1 | * | 7/2002 | Qin et al. | 310/208 |

FOREIGN PATENT DOCUMENTS

| | | | |
|---|---|---|---|
| JP | 06284614 A | * | 10/1994 |
| JP | 2001-275291 | | 5/2001 |
| JP | 2001275291 A | | 10/2001 |
| JP | 2004-328917 A | * | 11/2004 |

\* cited by examiner

*Primary Examiner*—Burton Mullins
(74) *Attorney, Agent, or Firm*—Proskauer Rose LLP

(57) ABSTRACT

An electric motor is provided with a multi-layered winding stator core configuration. A plurality of individual layers of wire strands are successively formed on each stator pole of a pole pair. Each winding layer is fabricated of the same relatively thin wire gauge. A first layer is applied directly on a pole and each successive layer is assembled on top of the last previous layer. Each layer of one pole of the pole pair is connected in series with a layer of the other pole of the pole pair to obtain a number of individual series coil connections equal in number to the number of layers. As inductance and resistance characteristics of the layers differ from each other as the layers increase in distance from each pole, layers from one pole of the pole pair are connected to respective layers different in order from that of the other pole pair.

15 Claims, 3 Drawing Sheets

MOTOR STATOR HAVING TRANSPOSED WINDING LAYERS

FIELD OF THE INVENTION

The present invention relates to motor stators and, more particularly, to a multi-layered winding configuration of a stator core pole pair and a technique for forming and connecting the winding layers.

BACKGROUND ART

Development of efficient electric motor drives for vehicles, with improved electronic control systems and portable power sources, has drawn increasing attention as a viable alternative or adjunct to combustion engine drives. For example, U.S. Pat. No. 6,492,756 to Maslov et al. and U.S. Pat. No. 6,617,746 to Maslov et al. describe motor structures that provide high torque output capability with minimum power consumption that are especially suitable to electric vehicle propulsion. Electromagnets are used as isolated magnetically permeable structures configured in a stator annular ring. Isolation of the electromagnet groups permits individual concentration of flux in the magnetic cores of the groups, with virtually no flux loss or deleterious transformer interference effects with other electromagnet members. Operational advantages are gained from this segmented electromagnetic architecture. Magnetic path isolation of the individual pole pair from other pole groups eliminates a flux transformer effect on an adjacent group when the energization of the pole pair windings is switched.

Electric traction systems demand high torque from low voltage propulsion units. The low voltage restriction satisfies a need to conserve space by minimizing the number of battery cells and eliminating extra insulation that otherwise would be required for high voltage protection. In order to deliver high torque from a low voltage source, it is necessary to draw high current through the motor windings. The windings must be thick to provide the high current capability. The use of a thick single wire to form a stator winding typically introduces unacceptable high frequency skin effect losses. To reduce such losses it has been customary to use multiple strands of thin wires in a bundle to provide the required coil thickness. The individual strands can share the current load while reducing skin effect losses. The bundling of such wires is commonly known as "wires in hand."

A conventional automated technique for bundled multiple stranded stator winding formation is illustrated in the schematic diagram of FIG. 1. A four wires in hand process is exemplified. Each wire strand 10 is supplied by an individual wire spool 12. All strands are fed simultaneously to wire bundler 14, which combines the strands into a single bundle 16 of four wires in hand. The bundle is then wound on each stator pole 18 of stator assembly 20. A human operator guides the thick wire bundle around the slowly rotating stator assembly. Several drawbacks can be attributed to this technique. As one spool of wire is required for each strand, a winding system that must accommodate an increased number of strands becomes complex. Bending a thick bundle of wire on a stator is difficult while maintaining the high tension required from the winding machine. The "slot fill factor," which is a measure of the amount of the slot volume occupied by the winding, is reduced as the thickness is increased. These factors seriously limit the number of strands that can be bundled in the conventional winding construction.

The need thus exists for a thick stator winding that can provide maximum slot fill factor with uniform inductance and resistance characteristics. A winding technique is needed that would provide such a winding that has no inherent limitation on the winding thickness and can provide appropriate bending with a minimum of complexity.

DISCLOSURE OF THE INVENTION

The present invention fulfills the above described needs, at least in part, by successively forming a plurality of individual layers of wire strands on each stator pole of a pole pair. Rather than the prior art techniques of winding a single thick wire or a number of bundled wires on a stator, the present invention forms a number of winding layers, each winding layer fabricated of the same relatively thin wire gauge. The winding layers are formed individually on each pole of a pole pair. A first layer is applied directly on a pole and each successive layer is assembled on top of the last previous layer. Each layer of one pole of the pole pair is connected in series with a layer of the other pole of the pole pair to obtain a number of individual series coil connections equal in number to the number of layers. As inductance and resistance characteristics of the layers differ from each other as the layers increase in distance from each pole, layers from one pole of the pole pair are connected to respective layers different in order from that of the other pole pair. Preferably, a transposition of connections between layers is made, wherein the first layer formed of one pole is connected to the last layer of the other pole, and so on. Induction and resistance characteristics thus are balanced. All of the series connections for the pole pair are connected in parallel. The winding has the attributes of a thick winding in that the plurality of winding layer circuits share high current load, while facilitating formation of the winding with a wire of relatively small wire gauge. The thin wire layered formation provides large slot fill factor.

The present invention is particularly advantageous in a motor having a plurality of pole pair segments, each pole pair segment having multiple winding layers connected as aforementioned. Such pole pair segments that are separated and ferromagnetically isolated from each other provide the benefits of high torque and high efficiency operation.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

The present invention is illustrated by way of example, and not by way of limitation, in the figures of the accompanying drawing and in which like reference numerals refer to similar elements and in which.

DETAILED DESCRIPTION OF THE INVENTION

Figure 1:
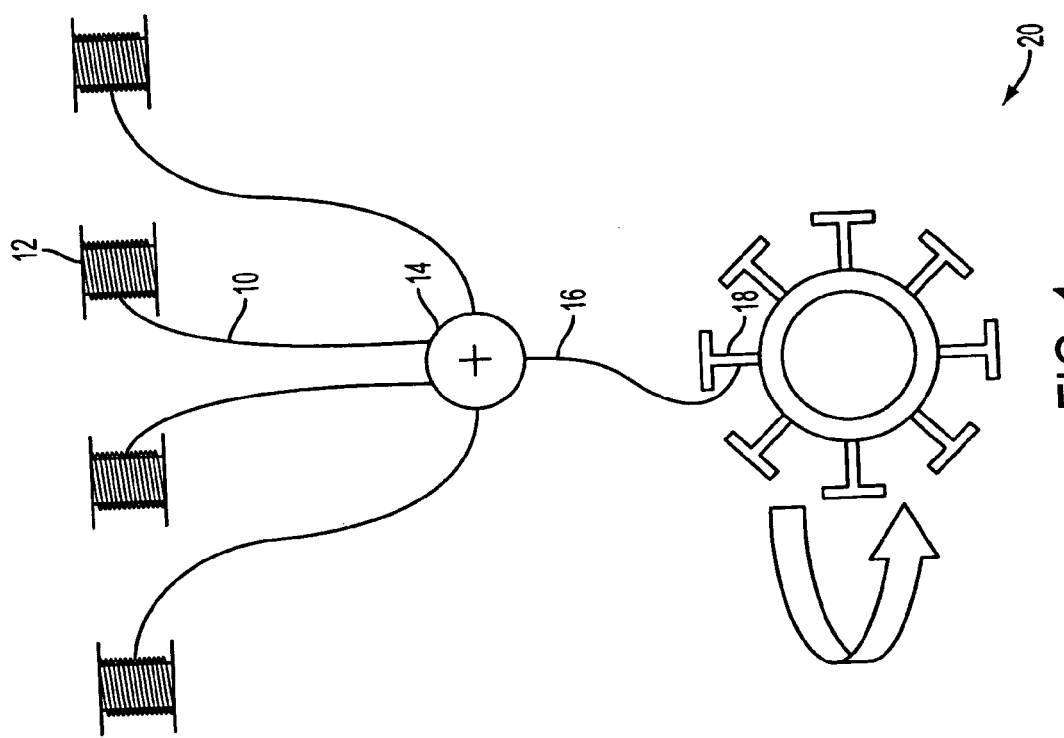
FIG. 1 is schematic diagram of a conventional automated technique for bundled multiple stranded stator winding formation.
Figure 2A:
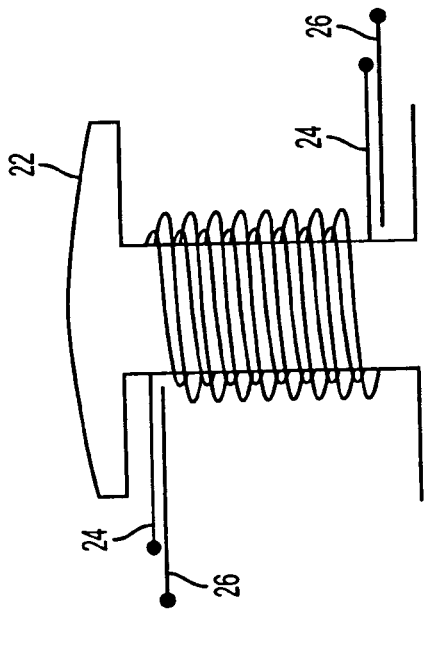
FIGS. 2a–2d are schematic diagrams of formation of a plurality of winding layers in accordance with the present invention.
Figure 2B:
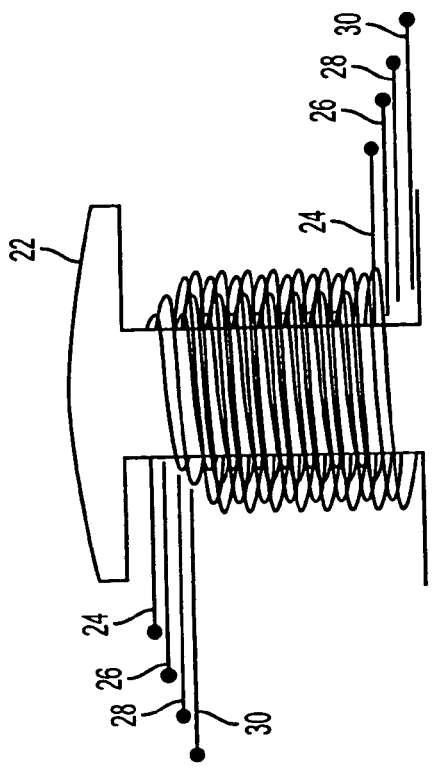
Figure 2C:
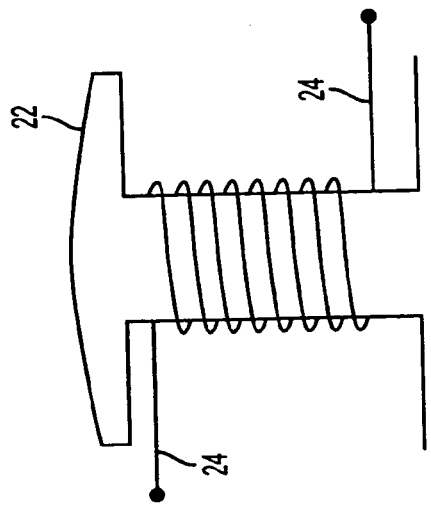
Figure 2D:
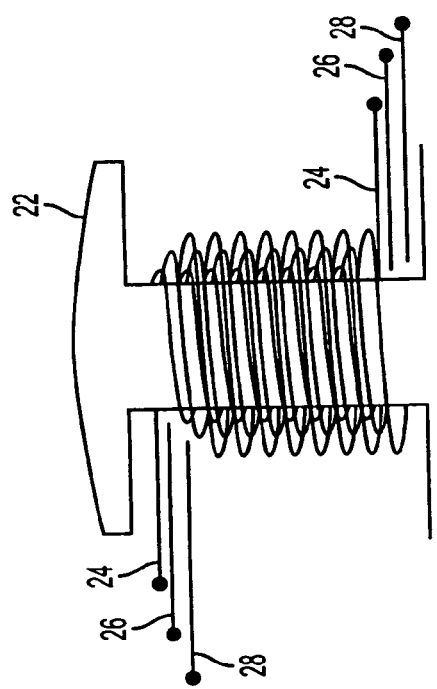

FIGS. 2a–2d depict the formation of four winding layers on a stator pole 22 of a pole pair segment. The selection of four layers is merely representative of the invention as the number of layers can be adjusted in dependence upon various factors, including current load requirements, specific wire gauge, number of coil turns, and pole configuration. In FIG. 2a, a winding layer 24 is formed on pole 22. The wire from which the winding is formed is of relatively low wire gauge and supplied from a wire spool, not shown. A relatively low tension coil-winding machine of conventional design can be utilized as bending of the wire is not difficult. In FIG. 2b, a second winding layer 26 is formed over the first winding 24. Wire from the same spool is used by the same winding machine. As a single strand of the same wire source is used to form both layers, a high slot fill factor can be achieved. In similar fashion, winding layers 28 and 30 are formed over the preceding layers, as illustrated respectively in FIGS. 22c and 22d. As each layer is applied as a single strand from the same spool supply, from coil-winding machine perspective, there is no limit to the number of layers that can be formed.

Figure 3:
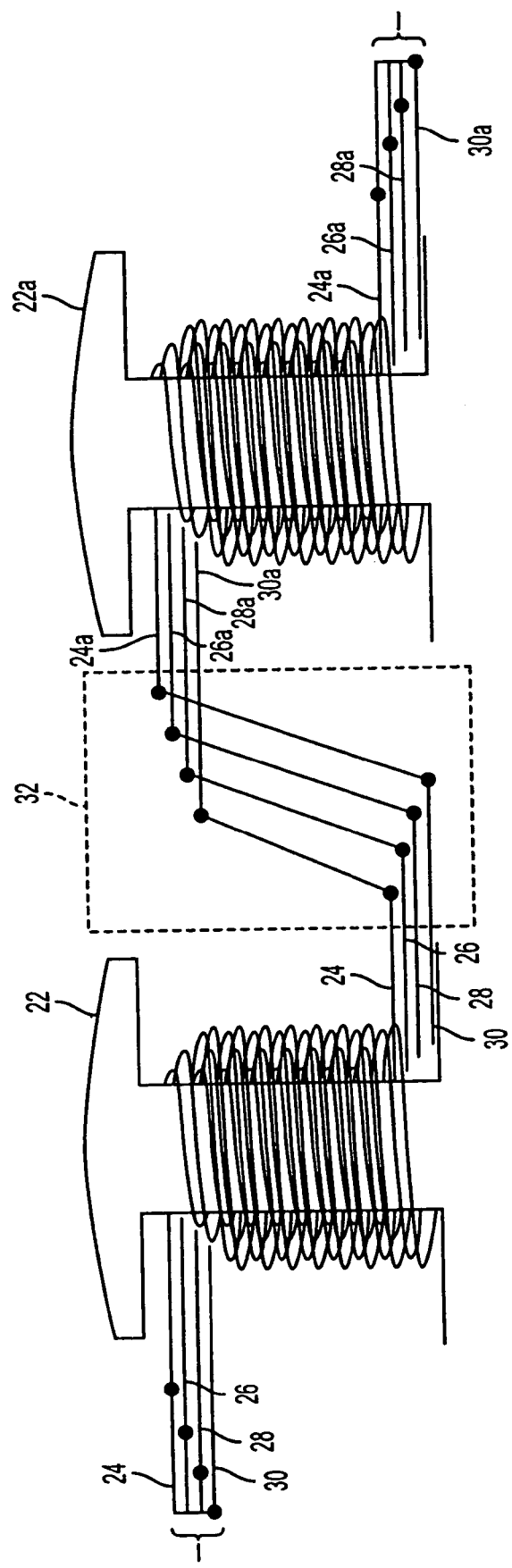
FIG. 3 is a schematic diagram of interconnection of winding layers formed as shown in FIGS. 2a–2d.

The simplified schematic diagram of FIG. 3 depicts pole 22, as described with respect to FIGS. 2a–2d, and the other pole 22a of the pole pair segment. Winding layers 24a, 26a, 28a and 30a are formed on pole 22a in the same manner as described with respect to the formation of winding layers 24, 26, 28 and 30. In the preferred embodiment, each of the winding layers has the same number of winding turns. As the mean winding length of the layer increases from the bottom layer to the top layer, the resistance and inductance of layers will also increase from bottom to top. To avoid interlayer current flow that can occur from random series or parallel connection within layers, the layers of poles 22 and 22a are series connected with each other with layer transposition. That is, layer 24 of pole 22 is connected to layer 30a of pole 22a, layer 26 of pole 22 is connected to layer 28a of pole 22a, layer 28 of pole 22 is connected to layer 26a of pole 22a, and layer 30 of pole 22 is connected to layer 24a of pole 22a. The connections are made to inner layer terminals shown within the dotted line block 32. The four series circuits containing a layer from each pole are balanced with respect to their resistance and inductance characteristics as a result of the layer transposition. The series circuits are connected in parallel at their outer terminals.

The stator electromagnet pole pair configuration of FIG. 3 is preferably one of a plurality of stator segments that are distributed about an air gap, such as illustrated in the Maslov et al. patents, described above. Each segment may correspond to one phase of a multiphase motor control system, each electromagnet pole pair fed from an individually controlled supply. Alternatively, Each phase of a multiphase control system may supply a plurality of electromagnets.

As can be appreciated, a greatly simplified winding technique has been provided, while avoiding limitations of bundled wiring. Multiple wire strands of balanced layer connections share current load without appreciable interwinding current flow. The preferred illustrated embodiment has been envisioned for application with segmented electromagnet architecture. However, it is contemplated that the same layered winding and connection techniques provide the same advantages when applied to a continuous salient pole stator core.

In this disclosure there are shown and described only preferred embodiments of the invention and but a few examples of its versatility. It is to be understood that the invention is capable of use in various other combinations and environments and is capable of changes or modifications within the scope of the inventive concept as expressed herein. For example, the provision of multiple layers of thin wire gauge, in lieu of a single thick wire or bundled wire, can be applied to advantage in assembling a winding on a slotted stator core. As discussed earlier, the invention is also applicable to a number of pole winding layers other than four so that varying load requirements and wire gauges can be accommodated. It should further be appreciated that, while the number of coil turns in each layer has been disclosed above to be equal, layers can be adjusted to have different numbers, either among layers on the same pole or between layers on both poles of the pole pair.

What is claimed is:

1. A method of winding a stator core of an electric machine having at least one pole pair, the method comprising the steps of:
   winding in successive order a predetermined number of individual layers of coiled wire strands on each pole of the pole pair so that each successive layer overlays a preceding layer radially from the respective pole; and
   connecting in series each of said layers of a first pole of the pole pair with a layer of a second pole of the pole pair to obtain individual series coil connections on the pole pair equal in number to said number of layers, the connections inversely connecting an order of the first pole layers to an order of the second pole layers.

2. The method as recited in claim 1, wherein the stator comprises a plurality of pole pair segments that are separated and ferromagnetically isolated from each other, and said steps of winding and connecting are applied to each of the plurality of pole pair segments.

3. The method as recited in claim 1, wherein:
   said winding step comprises assembling a first layer directly on a pole and assembling each successive layer on top of a last previous layer, and said connecting step comprises joining a layer formed on the first pole to a layer formed on the second pole to obtain a transposition of layer connections.

4. The method as recited in claim 3, comprising the additional step of connecting all of the series connections of the pole pair in parallel.

5. A machine stator comprising:
   a plurality of pole pairs, each pair having a plurality of coil layers wound on each pole of a core, said layers successively overlaying each other in position about the pole, the layers of a first said pole connected to layers of a second said pole in inverse order to the position of the respective layers about the poles,
   wherein each core has a pair of poles, and
   wherein each of the plurality of pole pairs comprises a ferromagnetic core segment that is ferromagnetically isolated from each of the other pole pairs.

6. A machine stator comprising:
   a core having a pair of poles;
   a plurality of coil layers wound on each pole of said core, said layers successively overlaying each other in position about the pole, the layers of a first said pole connected to layers of a second said pole in inverse order to the position of the respective layers about the poles.

7. The machine stator as recited in claim 6, wherein the number of layers on each pole is the same and the connected layers form individual series circuits equal in number to the number of layers.

8. The machine stator as recited in claim 7, wherein each of the plurality of coil layers of both poles comprises the same number of coil turns.

9. The machine stator as recited in claim 7, wherein each of the series circuits comprises a layer from each pole and the series circuits are connected in parallel.

10. A machine stator comprising a plurality of pole pairs, each pair having a plurality of coil layers configured and connected as recited in claim 6.

11. The machine stator as recited in claim 10, wherein each of the plurality of pole pairs comprises a ferromagnetic core segment that is ferromagnetically isolated from each of the other pole pairs.

12. The machine stator as recited in claim 6, wherein each layer for a pole pair is connected to the same electric phase.

13. The machine stator as recited in claim 6, wherein each successive layer overlays an outside perimeter of a preceding layer.

14. A method of winding a stator core of an electric machine having at least one pole pair, the method comprising the steps of:

winding in successive order a predetermined number of individual layers of coiled wire strands on each pole of the pole pair segment so that each successive layer overlays the preceding layer; and connecting in series each of said layers of a first pole of the pole pair with a layer of a second pole of the pole pair to obtain individual series coil connections on the pole pair equal in number to said number of layers in inverse order to the position of the respective layers about the poles, wherein the machine stator comprises a plurality of pole pair segments that are separated and ferromagnetically isolated from each other, and said steps of winding and connecting are applied to each of the plurality of pole pair segments.

15. A machine stator comprising:

a plurality of pole pairs, each pair having a plurality of coil layers wound on each pole of a core, said layers successively overlaying each other in position about the pole, the layers of a first said pole connected to layers of a second said pole in inverse order to the position of the respective layers about the poles, wherein each core has a pair of poles, and wherein each of the plurality of pole pairs comprises a ferromagnetic core segment that is ferromagnetically isolated from each of the other pole pairs.

* * * * *